United States Patent
Carey et al.

(10) Patent No.: US 9,100,974 B2
(45) Date of Patent: Aug. 4, 2015

(54) SYSTEM FOR CONTINUOUSLY IMPROVING THE PERFORMANCE OF WIRELESS NETWORKS WITH MOBILE USERS

(71) Applicant: FIDELITY COMTECH, INC., Longmont, CO (US)

(72) Inventors: Joseph Carey, Longmont, CO (US); Robert Weaver, Boulder, CO (US)

(73) Assignee: FIDELITY COMTECH, INC., Longmont, CO (US)

( * ) Notice: Subject to any disclaimer, the term of this patent is extended or adjusted under 35 U.S.C. 154(b) by 133 days.

(21) Appl. No.: 13/861,919

(22) Filed: Apr. 12, 2013

(65) Prior Publication Data

US 2014/0003365 A1   Jan. 2, 2014

Related U.S. Application Data

(60) Provisional application No. 61/623,245, filed on Apr. 12, 2012.

(51) Int. Cl.
H04W 72/08  (2009.01)
H04W 72/04  (2009.01)

(52) U.S. Cl.
CPC .......... *H04W 72/085* (2013.01); *H04W 72/046* (2013.01)

(58) Field of Classification Search
None
See application file for complete search history.

(56) References Cited

U.S. PATENT DOCUMENTS

| | | | |
|---|---|---|---|
| 5,771,439 A | 6/1998 | Kennedy, Jr. et al. | |
| 6,006,110 A | 12/1999 | Raleigh | |
| 6,181,276 B1 | 1/2001 | Schlekewey et al. | |
| 6,266,528 B1 | 7/2001 | Farzaneh | |
| 6,404,386 B1 | 6/2002 | Proctor, Jr. et al. | |
| 6,509,872 B2 | 1/2003 | Ishii et al. | |
| 6,571,097 B1 | 5/2003 | Takai | |
| 6,920,192 B1 | 7/2005 | Laroia et al. | |
| 7,324,782 B1 | 1/2008 | Rudrapatna | |
| 7,340,277 B2 | 3/2008 | Nakamura | |
| 7,437,159 B1 | 10/2008 | Yarkosky et al. | |
| 7,522,552 B2 | 4/2009 | Fein et al. | |
| 7,525,486 B2 | 4/2009 | Shtrom et al. | |
| 7,528,789 B2 | 5/2009 | Gothard et al. | |
| 7,535,410 B2 | 5/2009 | Suzuki | |
| 7,609,648 B2 | 10/2009 | Hoffmann et al. | |
| 7,893,882 B2 | 2/2011 | Shtrom | |
| 7,916,810 B2 | 3/2011 | Tiirola et al. | |
| 8,040,278 B2 | 10/2011 | Maltsev et al. | |
| 8,085,206 B2 | 12/2011 | Shtrom | |
| 8,217,843 B2 | 7/2012 | Shtrom et al. | |
| 2002/0047800 A1 | 4/2002 | Proctor, Jr. et al. | |
| 2004/0114535 A1 | 6/2004 | Hoffmann et al. | |
| 2004/0166881 A1* | 8/2004 | Farchmin | 455/457 |
| 2005/0032531 A1* | 2/2005 | Gong et al. | 455/456.5 |
| 2005/0250543 A1* | 11/2005 | Thermond | 455/562.1 |
| 2007/0205943 A1 | 9/2007 | Nassiri-Toussi et al. | |
| 2007/0232359 A1* | 10/2007 | Pinheiro et al. | 455/562.1 |
| 2013/0189929 A1* | 7/2013 | Takahashi et al. | 455/67.7 |
| 2013/0222515 A1* | 8/2013 | Abuan et al. | 348/14.01 |

* cited by examiner

*Primary Examiner* — Eunsook Choi
(74) *Attorney, Agent, or Firm* — Marsh Fischmann & Breyfogle

(57) ABSTRACT

A system and method is provided for performing an automated a site survey process for adjusting radiation patterns of access point antennas in a wireless network. The system and method utilize wireless mobile devices in their normal process of carrying about ordinary traffic to measure network performance. Further, such information is utilizes to configure the radiation patterns of the access point antennas to tailor coverage areas of the antennas to current network conditions.

26 Claims, 13 Drawing Sheets

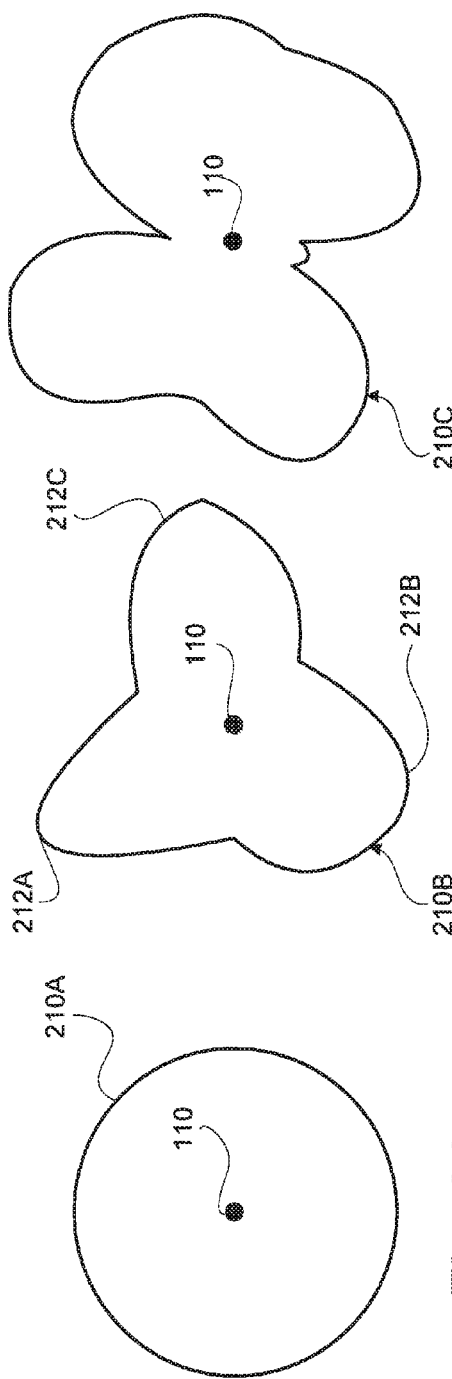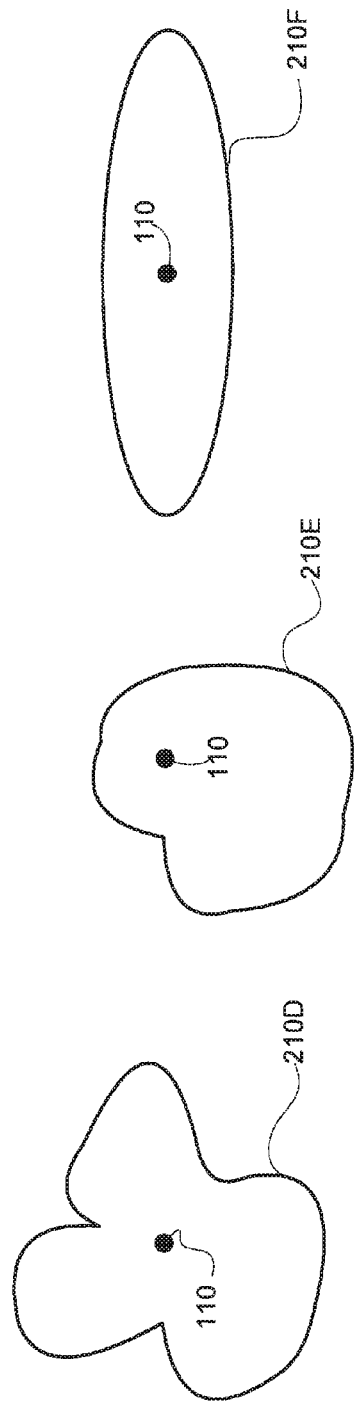

| | | | |
|---|---|---|---|
| + | + | + | + |
| + | + | + | + |
| 2,1 + | + | + | + |
| 1,1 ● + 1.0 | 1,2 + 0.7 | 1,3 + 0.6 | 1,4 + 0.4 |

110 ↗ (pointing to dot)

Fig. 9A

| | | | |
|---|---|---|---|
| + | + | + | + |
| + | + | + | + |
| 2,1 + | + | + | + |
| ● + 1.0 | 1,2 + 0.8 | 1,3 + 0.7 | 1,4 + 0.55 |

Fig. 9B

SYSTEM FOR CONTINUOUSLY IMPROVING THE PERFORMANCE OF WIRELESS NETWORKS WITH MOBILE USERS

CROSS REFERENCE

This application claims the benefit of U.S. Provisional Application No. 61/623,245 having a filing date of Apr. 12, 2012, the entire contents of which are incorporated by reference herein.

FIELD

Systems and methods are described that enable wireless networks to automatically adapt to enhance their performance in a geographic area they cover.

BACKGROUND

Many wireless networks, such as cellular phone networks, involve a combination of network infrastructure and mobile devices. In the case of a WiFi network, the network infrastructure is referred to as an "access point," in cellular networks it is typically referred to as a "Base Station," or "eNB". For purposes described here, these are all equivalent. Similarly, for WiFi networks, the mobile devices are typically called "client" devices and for cellular networks they are usually called "handsets," or "subscriber devices." For purposes described here, they are interchangeable.

Frequently, the network infrastructure is mounted at an elevated location, such as on a tower, while the users are typically at ground level. In such a situation, the radio wave propagation is affected in unpredictable ways by objects in the environment, such as trees, buildings and so forth. Radio signals will often follow the roadways in urban canyons, bouncing back and forth between buildings, and not following a direct line between the emitter and receiver. This unpredictable behavior makes it quite difficult to plan a wireless network.

Locations for towers and base stations can be hard to obtain, and once obtained, it can be difficult to predict precisely what kind of antenna will best provide coverage to the required area near the base station site. Because towers can be so difficult to obtain, those that are available are often not ideally located to provide wireless coverage.

Historically, the network operator has had a selection of standard antennas for their base stations. For example, they might choose to use an omnidirectional antenna, a 90 degree sector, or a 120 degree sector. Each of these antennas is manufactured with dimensions to achieve the desired radiation pattern. The radiation pattern of an antenna is always described in an anechoic environment—one where there are no reflections or objects to absorb signal energy.

However, because of the characteristics of the propagation environment described earlier, it has historically required a great deal of trial and error (or possibly experience) to predict how a particular antenna would perform in a given real-world situation.

Typically, the way a network operator would deal with this situation was through trial and error. They would make an educated guess as to the best antenna to use in a particular situation, they might do some simulation to estimate coverage, and then perform a "site survey," driving around in a dedicated vehicle with specialized test equipment and collecting data on the wireless coverage. Based on the results of the drive test, they might change antennas at the base station or adjust the aiming of the antennas to address problem spots, and then repeat the drive test, to make sure that fixing one problem didn't introduce a new problem.

This works well enough, but it is labor intensive and only provides a "snapshot" in time of network performance. The process only characterizes the network performance at the time when the site survey was conducted. If a building is constructed, or foliage conditions change, the wireless propagation characteristics will also change, frequently in unpredictable ways. Also, if an antenna needs to be adjusted, it involves visiting the site and possibly climbing a tower and then conducting another site survey—a labor intensive and expensive exercise.

SUMMARY OF THE INVENTION

The present invention automates a site survey process, using mobile devices themselves, in the normal process of carrying about their ordinary traffic, to measure network performance and to configure an adaptive antenna at a base station or access point to adapt a coverage area of the adaptive antenna. Furthermore, the present invention includes a database of historical network performance measurements so that the network performance can be characterized as the access point antenna is reconfigured. Finally, the present invention uses the mobile clients to opportunistically sample the network coverage, thereby effectively providing a continuous site survey. These samples are stored in the database to be used to adapt the coverage and improve overall wireless network performance.

It has been recognized by the inventors that in most wireless applications, where wireless clients communicate with a wireless access point (e.g., cell tower or other antenna) the configuration of the area covered by that access point is generally not uniform. For instance, on a flat plain, an omni-directional antenna may provide coverage for a near circular geographic area where the antenna is located at the center of the circle. However, in practice, most geographic areas are non-uniform (e.g., have elevation changes) and further include reflectors or absorbers (e.g., buildings, trees, etc.) that affect the signal strength between a wireless client and an access point. Accordingly, there are instances where it is desirable to adapt a coverage of an access point to a geographical area that is to be covered by that access point. In this regard, it may be desirable that the access point provides coverage for a specified geographical area or in a manner that reduces overlap with adjacent access points. Further, it has been recognized significant costs are incurred in wireless networks based on the site improvements of multiple access points (e.g., towers) and that the ability to tailor the coverage area of such an access point for a particular area may reduce the total number of access points required for an overall region including that geographic area. Another important factor in relation to the coverage of a particular area is that the limiting factor is often the ability of the access point to receive communications from client devices within its coverage area. That is, rather than only measuring the signal strength received from the access point at various locations within the coverage area, it has been recognized that another limiting factor is the ability of the client devices to communicate with the access point (i.e. for the access point to receive client communications). That is, it is common for an access point to provide a significantly larger signal than those received from client devices within their coverage area. Stated otherwise, most wireless devices have limited transmitting power and this is the limiting factor in communication between the client device and the access point, since most packets transmitted between the access point and the mobile device need to be acknowledged. Also, because of its elevated location, the base station is often susceptible to more interference than the mobile, which is located at ground level, among the clutter of foliage and buildings.

For instance, and not by way of limitation, 4G networks require considerable data transfer rates between the client device and the eNB. In order to achieve these data rates, wireless providers are increasing the densities of their access points (e.g., cell towers, etc.).

Aspects of the presented inventions are based on the realization that the non-uniform coverage and/or usage patterns within a coverage area may result in differing transfer rates in (i.e., bandwidth requirements) in different regions of a coverage area. For instance, an access point situated on an edge of a city, (e.g., housing and businesses on one side and open space on a second side) will likely provide more communications with the developed areas of the coverage area than the undeveloped areas. Accordingly, the ability to shift more resources of the access point to the developed areas (or other desired regions) of the coverage area may improve the wireless service (e.g. download rate) of the majority of the users of that coverage area. This may likewise allow for reducing the number of access points required. Furthermore, it is recognized that the access requirements of wireless users in a coverage area may change over time. For instance, the number of users in a coverage area may change throughout the day. That is, during the working day, when multiple people are located within a business park region within a coverage area, access needs may be high and a large number of wireless clients may be in communication with the access point. Conversely, during these working hours, other regions of the coverage area (e.g., residential) may have a reduced bandwidth need. Accordingly, it may be desirable to shift available resources based on the current needs of the system.

Accordingly, provided herein are systems, methods, and apparatuses (i.e., utilities) that allow for providing coverage in a wireless network where at least a first access point provides wireless coverage (e.g., RF coverage) for client devices of at least one geographic area. In this utility, each access point will include one or more electronically configurable antennas having adjustable radiation patterns. Such electronically configurable antennas includes, without limitation phased arrays, switched delay line antenna system, adjustable antenna weights in firmware and/or digital signal processing arrangements. In one particular arrangement, a phased array having three or more (e.g., 4, 5, 6, 7, 8, etc.) antenna elements that are individually adjustable (e.g., phase and or magnitude) is utilized. The individual elements allow for altering the radiation pattern of the antenna. In such an arrangement, the location of the access point may be identified or defined relative to a coordinate system of the first geographic area (e.g., coverage area).

In order to determine the usage patterns of the coverage area, the utility receives wireless communications originating from wireless clients within the geographic area. In this regard, such wireless clients may be used to create a site survey during their normal wireless communications with the access point. To enable use of the client devices to perform a site survey, the wireless communications from the clients include client location information. In one arrangement such wireless location information may include GPS information. However, it will be appreciated that any location information that may be provided by the wireless clients may be utilized. For instance, cell networks may provide location information that is based on triangulation of signals received by multiple cell towers. In any arrangement, the location of the wireless client is available to the access point. This location information may be utilized to identify a client position within the coordinate system of the coverage area. Further, the utility is operative to obtain a signal quality indication for the wireless client. This signal quality indication is indicative of a signal quality of a wireless communication as received by the access point. Such signal quality indications may include, without limitation, received signal strength indications (RSSI) or signal to noise ratios (SNR), as well as link data rate and packet retry rate. In addition, the access point may be able to determine the direction from which the signal transmitted by the wireless client arrives (the angle of arrival or AoA) which may be different from actual direction the wireless is located because of reflections or other irregularities in the RF environment. In further arrangements, the wireless clients may also provide signal strength indications of signals received from the access point by the wireless client. These client positions and signal quality indications are stored to an electronic storage media (e.g., database). The utility is operative to utilize the saved positions and signal quality indications to adjust the radiation pattern of the one or more electronically configurable antennas that are located at the access point.

While the utility is operative to adjust the radiation pattern based on a single received communication, more typically the utility utilizes a multiplicity of client positions, signal strength indications (e.g., from and/or to client devices), and possibly AoA's to determine usage patterns within the geographical area. In this regard, it may be possible to identify sub-regions having greater usage. Likewise, it may be possible to determine sub-regions within the geographical area that have different usage patterns at different temporal periods (e.g., day, week, etc.). In any arrangement, once a data set of client positions and signal strength indications are available, the radiation pattern of the antenna may be adjusted to enhance coverage (e.g., improve data transfer rates) for client devices within the coverage area. For instance, more signal strength may be applied to a region of higher usage while less signal strength is provided to an area of lower usage. Likewise, if a client is located at the edge of a coverage area it may be possible to extend the coverage area in that direction to improve communication with the client device if, for example, signal strength may be reduced in other areas of the coverage area without affecting current users of that coverage area.

In order to statistically analyze the network performance statistics in the database of usage, it may be desirable to subdivide the coverage area into a grid, either regular or irregular. That is, a coordinate system of the coverage area may be divided into a grid of predetermined areas. As will be appreciated, over time, multiple indications of signal strength may be received from common grid locations (e.g. client positions) within the coverage area. Accordingly, it may be desirable to perform a statistical analysis of these multiple indications for a common area in order to determine an average, median, mode, maximum, minimum, or other mathematical computation of the signal strength for that grid location. In this regard, it may be possible to identify areas of low signal strength within a coverage area. For instance, it may be possible to identify (e.g., automatically) urban canyons and other areas of reduced signal strength. Accordingly, the radiation pattern of the antenna or antennas at the access point may be adjusted to improve coverage/communications in these areas. In further arrangements, it may be desirable to establish a correspondence between grid locations and the AoA of signals from wireless clients and adjust the radiation pattern of the antenna based on this transformed data. It will be appreciated that there may be a variety of sophisticated combinations of these analyses that will yield useful results in particular situations.

The generation of radiation patterns for a particular coverage area may include both dynamic adjustment/generation and utilization of predetermined radiation patterns. In the former regard, the utility may be operative to determine location and signal strengths of current users within the coverage area. Based on the signals received from these current users, the system may adjust the electrically configurable antennas. For instance, in the use of a phased array, the system may be operative to adjust the phases and/or magnitudes of one or more antenna elements to improve the coverage of the current users. In this regard, it may be necessary for the system to query these current users after adjusting the antennas. Thus, the current users may re-submit location and signal quality indications such that a determination may be made as to whether the adjustments to the antenna have improved, decreased or left the coverage unchanged.

It will be appreciated that there are a variety of ways in which the utility may adjust or adapt the antennas. In one arrangement, the utility may examine the measured quality of coverage compared to the expected quality and select or synthesize an new radiation pattern better calculated to provide acceptable coverage levels. In another arrangement, the utility may heuristically adapt the antennas in a trial and error process in order to generated acceptable coverage levels. In this regard, the system may adjust the antennas until the wireless clients have a signal quality indication that meets a minimum predetermined threshold. Other arrangements may include variations on or combinations of these two approaches. In any event, the adjustment of the radiation pattern of the antenna may be an iterative process where the utility queries current wireless clients multiple times. In will be further appreciated that such wireless clients may include all clients within a coverage area not just clients that are actively accessing the access point. That is, clients not actively in use by their owners (e.g., making phone calls, downloading data) may provide passive signals (i.e. from the perspective of their users) to the utility for use in performing in the site survey.

Over time, it will be appreciated that acceptable radiation patterns may be determined for a particular coverage area based on the current usage patterns within that area. In this regard, these radiation patterns may be stored by the utility. Accordingly, upon identifying usage patterns that are similar to the usage pattern of the predetermined radiation patterns, a radiation pattern that is acceptable for the current usage pattern may be selected and implemented by the antenna.

BRIEF DESCRIPTION OF THE FIGURES

FIGS. 3A-3F illustrate exemplary beam patterns for adaptive antennas.

FIGS. 9A and 9B illustrate iterative calculation of probability of successful transmission for an exemplary grid.

DETAILED DESCRIPTION

The present invention is based in part on the realization that the coverage needs of a wireless network are typically non-uniform. In this regard, variations due to geography and/or client density within the coverage area of an access point (e.g., base station, cell tower, etc.) are dynamic and the provision of a uniform signal from an access point to a coverage area may, in some instances, not provide the most efficient use of the access point. Further, it has been recognized that utilization of adaptive antenna systems may allow for varying the signal strength within a particular coverage area. For instance, in one specific embodiment use of a Phocus Array of Fidelity Comtech allows adapting an antenna beam pattern to enhance its coverage in a given area. However, no process or application exists today to systematically monitor the coverage in a region so that coverage may be enhanced for the best RF performance, particularly as the RF environment changes over time. Today, network operators use a trial and error process to manually adjust coverage as the environmental profile change. The use of an adaptive antenna as disclosed herein, automates the process of adjusting coverage as the profile (e.g., client needs and/or geographic profile) of a coverage area changes.

Provided herein is a computer implemented utility that allows for calculating antenna patterns for adaptive antennas to tailor the overall coverage of one or more adaptive antennas to a specific coverage area, which may be based on the actual use of mobile clients within the coverage area. While the aspects described herein are in the general context of computer-executable instructions of computer programs and software that run on computers (e.g., personal computers, servers, networked computers etc.), those skilled in the art will recognize that the invention also can be implemented in combination with other program modules, firmware and hardware. Generally, program modules include routines, programs, components, data structures, etc. that perform particular tasks or implement particular abstract data types. Moreover, those skilled in the art will appreciate that the invention can be practiced with other computer configurations.

As set forth herein, the adaptive antenna system monitors coverage automatically and adjusts the pattern of one or more antennas that provide coverage to an area to enhance coverage within the coverage area. This significantly reduces the time and expense required using the manual trial and error process. In once specific arrangement, the adaptive antenna system utilizes a phased array (e.g., Phocus Array) as set forth in U.S. Pat. No. 6,894,657 ("bi-directional vector modulator"), the entire disclosure of which is incorporated herein by reference.

Figure 1A:
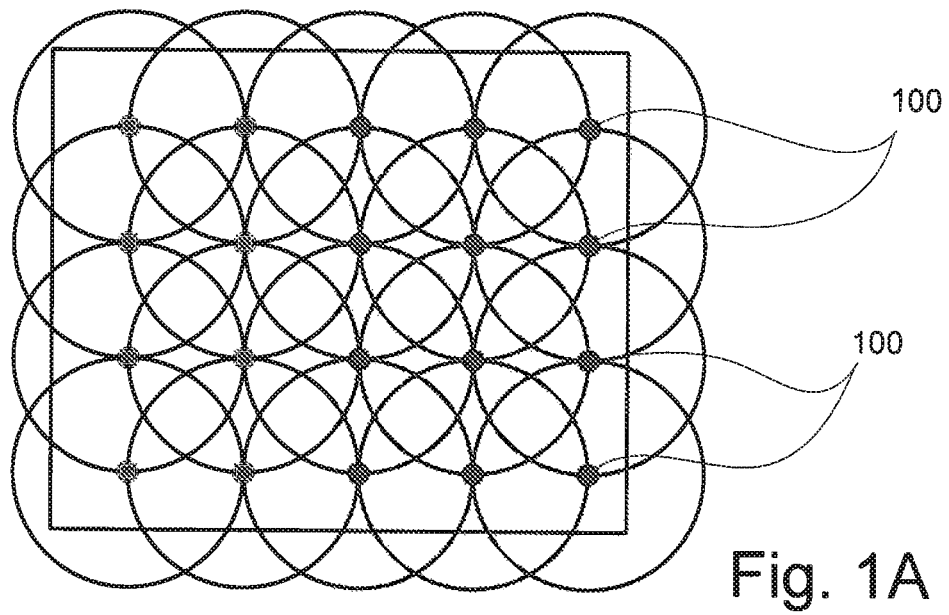
FIG. 1A illustrates a wireless coverage network using omni-directional antennas.
Figure 1B:
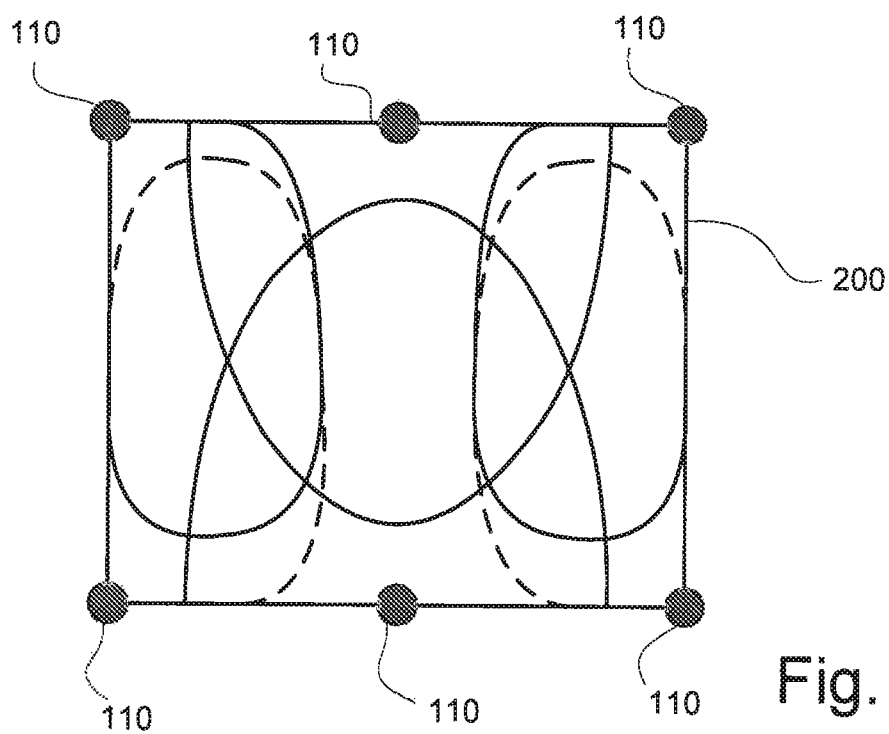
FIG. 1B illustrates a wireless coverage network using adaptive antennas.

Conventionally, wireless networks utilize a large number of access points that necessarily results in high up front infrastructure and equipment costs. Typically, each access point requires a pole or other consideration for mounting the wireless access points above the ground. Such a conventional antenna arrangement is set forth in FIG. 1A. As shown, a multitude of access points 100 provides overlapping coverage to all areas within a coverage area 200, which in the present embodiment is represented by a rectangle. However, it will be appreciated that such coverage areas are not so limited. As illustrated in FIG. 1B, the use of a adaptive antenna array 110 allows for providing coverage to the coverage area 200 utilizing significantly fewer access points. In the present embodiment, coverage in the illustration of FIG. 1B is provided by six (6) adaptive antenna arrays 110. This contrast with the use of 45 access points 100 as illustrated in FIG. 1A. While providing a significant improvement over conventional antenna systems, the use of adaptive antenna arrays, may be further enhanced by identifying the current needs of the system. That is, in an adaptive antenna array, coverage may be altered by tailoring control of the RF beam of each array in desired coverage areas. There are a number of advantages inherent in this approach. For instance, beam shaping of an adaptive antenna array provides greater coverage per access point resulting in far fewer antenna arrays necessary to provide complete coverage for an area and thus reduces upfront system acquisition and set-up costs. Further, interference and multi-path issues are dramatically reduced by use of such adaptive antenna arrays. Finally, and without limitation, maintenance and lifecycle costs are dramatically reduced due to the simplicity of the equipment architecture.

Figure 2B:
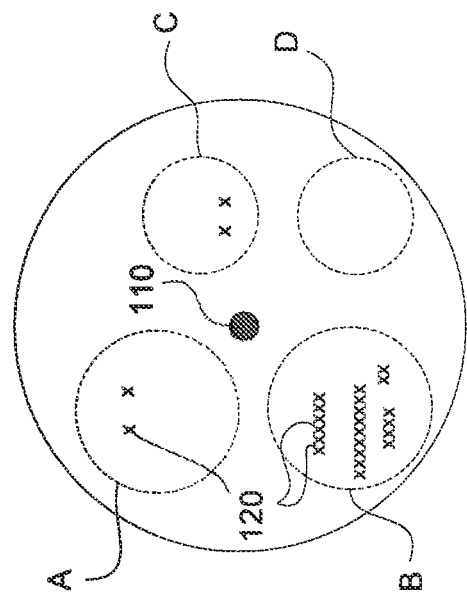
FIGS. 2A and 2B illustrate differing usage in a coverage area.
Figure 2A:
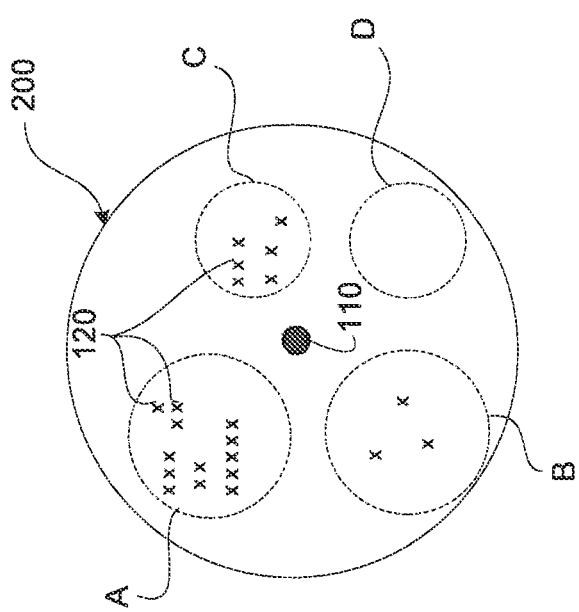

While providing significant improvements over standard/conventional antennas, it has been recognized that use of a adaptive antenna array system may be further enhanced by identifying the actual needs of a particular coverage area. FIGS. 2A and 2B graphically illustrate two embodiments of a coverage area 200. As shown, the coverage area 200 is a circular area, however, it will be appreciated that such a circular coverage area is presented by way of example and not by limitation. Furthermore, such coverage areas more commonly have variation due to geographic variation in terrain where the access point/adaptive antenna array 110 is utilized. As shown in FIG. 2A, different regions A-D of the coverage area 200 may have different client usage densities. That is, each X may represent a sample of the position and network quality experienced by a client 120 within the coverage area 200. Further, the knowledge of the location of each of these clients 120 within the coverage area 200 may allow for tailoring the coverage provided by the access point 110 to better service the needs of the clients 120 within the coverage area 200. In one example, FIG. 2A may represent an average client usage within a coverage area during a first temporal period. For instance, FIG. 2A may represent the client usage during the working hours of a work day. In this regard, a sub-region A may correspond with, for example, an office building within the coverage area 200. In such an arrangement, multiple clients 120 may be present within this region A at any given time during the work day. In contrast, a second region B may correspond with, for example, a residential area where fewer clients are present during the weekday working hours. FIG. 2B may represent the same coverage area at a temporally different time. For instance, FIG. 2B may represent the coverage area 200 after working hours or during a weekend. In such an arrangement, the access requirements for sub-region A may be significantly less as most of the clients who were previously located in region A during the working hours are no longer present. In contrast, sub-region B which corresponds to a residential area may have significantly more users during the night and weekend hours. Likewise, other areas of the coverage area 200 may consistently show little or no use. For instance, sub-region D may correspond with an open area (e.g. park or undeveloped area) where there is often little or no usage. Accordingly, it may be desirable to provide coverage tailored to regions A during the working hour and provide coverage tailored to region B during the non-working hours.

In order to determine which regions of a coverage area have differing access needs requires determining the location of the clients within the coverage area 200. In this regard, it is recognized that many wireless clients now have the capability to identify their own locations. That is, many wireless clients have GPS capability that allows for those clients to pinpoint their own location. In the present arrangement, these clients may provide their location information to the access point 110 upon contacting the access point and/or upon being queried by the access point. In this regard, the access point 110 and/or a related server may generate a historical usage pattern for the coverage area 200. Such historically usage patterns may allow for determining variations to the usage pattern that may be based on, for example, time of day, time of year, etc. Accordingly, by knowing the usage pattern within the coverage area, it may be possible to alter the radiation pattern (e.g., dynamically) of the access point 110 to provide better coverage to areas within the coverage area 200.

Recent improvements in handheld wireless devices, including smart phones, include location awareness, often provided through GPS or GPS-assisted technology. Such smart phones often have the ability to provide their users significant functionality. However, much of this functionality requires the access to the access point 110. More specifically, these enhanced handsets typically require significant data transfer rates between the handset and the access point 110 in order to provide their users, for example, internet access. Stated otherwise, the data needs of the wireless clients has increased with the advent of smart wireless client devices. In this regard, the data transfer rates require for such wireless clients is typically considerably in excess of the data transfer rates that were previously required for simple voice communications.

In general, data transfer rates are limited by the Shannon-Hartley Theorem which specifies a maximum rate at which information can be transferred over a communications channel of specified bandwidth in the presence of noise. The theorem states that the channel capacity includes an upper bound on the information rate (excluding error correcting codes) of clean or arbitrarily low bit air data, which can be sent with a given average signal power through a communication channel. There are theoretical exceptions to this theorem, however, the theorem holds for many applications. In any case, the theorem is based on the idea that data transfer rates are proportional to an average signal power that passes through the communication channel. As set forth herein, it has been recognized that the ability to adapt the radiation pattern of an access point 110 allows for selectively increasing the signal power to different regions within a coverage area based on, for example, the current or historic needs of those regions. This increased signal power may provide, inter alia, improved data transfer between the access point 110 and the clients within the coverage area 200.

Figure 4:
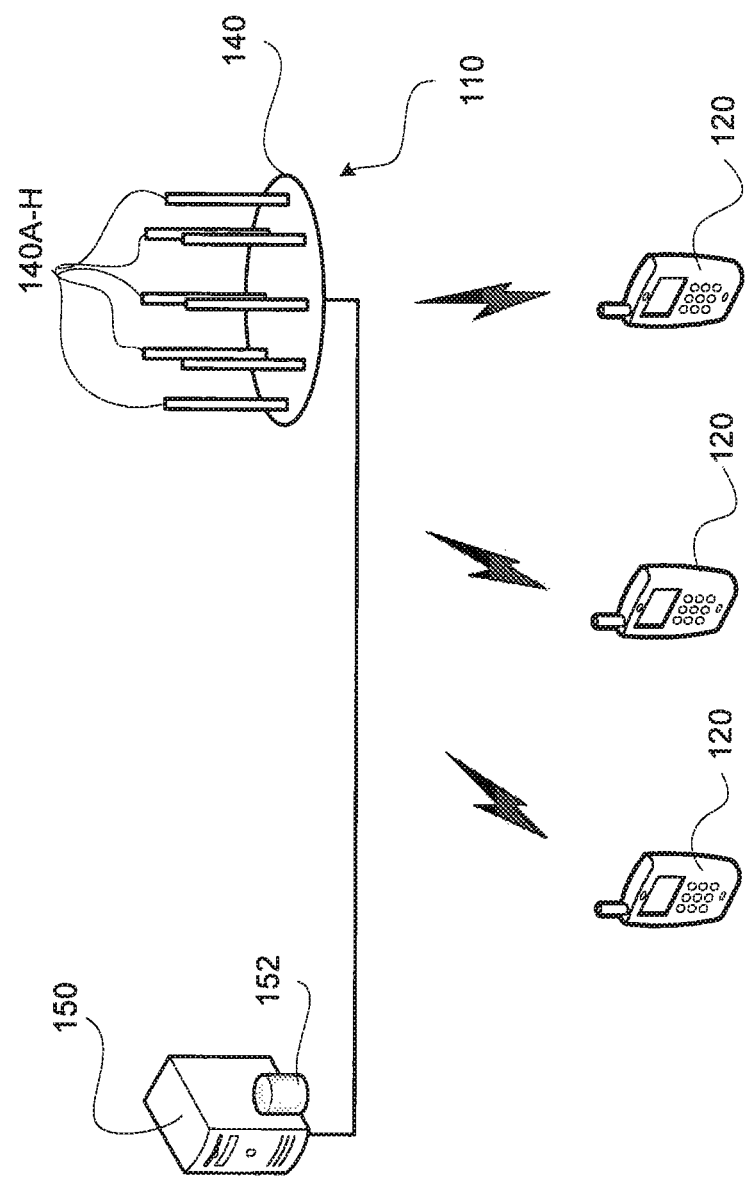
FIG. 4 illustrates an exemplary adaptive antenna.

FIGS. 3A through 3F illustrate non-limiting examples of radiation patterns that may be generated utilizing an adaptive antenna array(s) in accordance with aspects of the present invention. As illustrated, initially, a radiation pattern 210 of an access point 110 may be nearly circular. In this regard a circular phased array 140 as illustrated in FIG. 4 having equal phase and magnitude weights on each of its antenna elements 142 may generate a substantially circular radiation pattern 210. By adjusting the phase and/or magnitude of the signal to each antenna element of the circular array 140, it is possible to provide areas of preferential coverage within the radiation pattern 210. For instance, as shown in FIG. 3B, it is possible to provide a radiation pattern 210B having, for example, three lobes 212A-C. Referring briefly again to FIGS. 2A and 2B, it will be noted that such a radiation pattern 212 may provide improved coverage for the client usage pattern set forth in these exemplary illustrations. It will be appreciated that while areas of enhanced coverage may be provided, remaining areas within the coverage area are not entirely without coverage. That is, remaining areas outside the enhanced coverage areas may still be able to communicate with the access point 110. However, these other areas may have lower signal to noise ratios. Of note, while having a lower signal to noise ratio (SNR), these areas may be maintained above a predetermined minimum threshold.

As broadly set forth above, the system is variously comprised of several major components. See FIG. 4. Specifically, the system includes one or more base stations or access points 110, each with an adaptive antenna or antennas 140. A central server 150 communicates with the access points 110 and a database 152. This central server 150 may be located at an access point 110 or remotely. The database 152 stores both current information and historic results. Finally, one or more location-aware mobile devices or clients 120 communicate with the access point(s) 110. These clients may be vehicular devices, mobile phones, tablets etc.

The base stations may support any of a number of standard or proprietary protocols, including, but not limited to: IEEE 802.11, LTE and WiMax. The integration of the adaptive antenna with the base station/access point may be tightly coupled or loosely coupled. If it is loosely coupled (i.e. the access point was originally designed to operate with a standard, passive, non-adaptive antenna), then the central server may communicate with the antenna independently, as well as communicating with the access point directly. If tightly coupled, the antenna receives its control signals directly from the base station, and the controller must communicate with the base station, which then in turn configures the adaptive antenna.

The location aware mobile devices or clients are any type of wireless mobile device appropriate for communicating with the base station. This includes cellular telephones that have GPS capability or other methodology for locating their position. These location-aware clients 120 feature a network application that allows them to report their location when queried by the server 150. The location aware client may not only serve its traditional role as a communications device, it also serves as a sensor in the adaptive network.

The adaptive antenna may be of any of a variety of types. The illustration shows a particular type of electronic adaptive antenna 140, a phased array. A phased array adjusts its antenna pattern by reconfiguring a set of "signal weights"— magnitude and phases on multiple elements 142A-H. The adaptive antenna could be a different type of electronic device or could also be made of a set of mechanically adjustable components. The 'circular' phased array 140 as illustrated in FIG. 4 may generate a substantially circular coverage area 200 (see FIG. 3A) when each of its antenna elements 142A-H have equal phase and magnitude weights. By adjusting the phase and/or magnitude of the signal to each antenna element of the circular array 140, it is possible to provide altered radiation patterns as variously illustrated in FIGS. 3B-3F. For instance, as shown in FIG. 3B, it is possible to provide a radiation pattern having, for example, three lobes 112A-C.

FIG. 4, illustrates one non-limiting embodiment of an adaptive antenna that may be utilized in conjunction with the configuration utilities discussed herein. In the illustrated embodiment, the adaptive antenna 140 is defined by eight antenna elements 142A-H disposed in a circular array. Each of the antenna elements is typically disposed in front of a reflector (not shown). A control and processing system of the antenna or server 150 are coupled to each of the antenna elements and is adapted to adjust the signal (e.g., phase and/or magnitude) applied to each antenna element to produce a beam pattern.

As shown, the antenna elements 142A-h of the directional antenna 140 are arranged in a pattern of a regular convex polygon where an antenna element is disposed at each vertex of the polygon. For example, an array having eight equally spaced antenna elements would define a regular octagon. However it will be appreciated that other numbers of elements are possible and are considered within the scope of the present invention. Thus, such arrays may define hexagonal arrays. Further square, triangular etc. arrays could also be used. The directional antennas may be formed by any type of antenna element, including a patch or reflector. The antenna beams of the directional antenna elements typically overlap, so that from any azimuthal direction, the point is covered by more than one antenna beam.

The system seeks to adapt the radiation patterns of the access point antennas in two steps or phases. In a first phase, the system establishes a geographic and/or RF "area of responsibility" for each antenna and determines an initial radiation pattern for the access point 110 (if there is only a single access point, the area of responsibility is the entire coverage area). Areas of responsibility may overlap, so that more than one base station can service a particular region. In a second phase, the system adjusts the radiation pattern of the access points 110 to enhance the actual coverage. The system may iterate the second phase many times. The system may also modify the various areas of responsibility based on the results of the second phase and then repeat the second phase. Additionally, in the event of a failure of one of the access points 110, the system can significantly modify the areas of responsibility of access points 110 adjacent to the failed access point and then rerun the second phase in order to adapt to the failure.

Figure 5A:
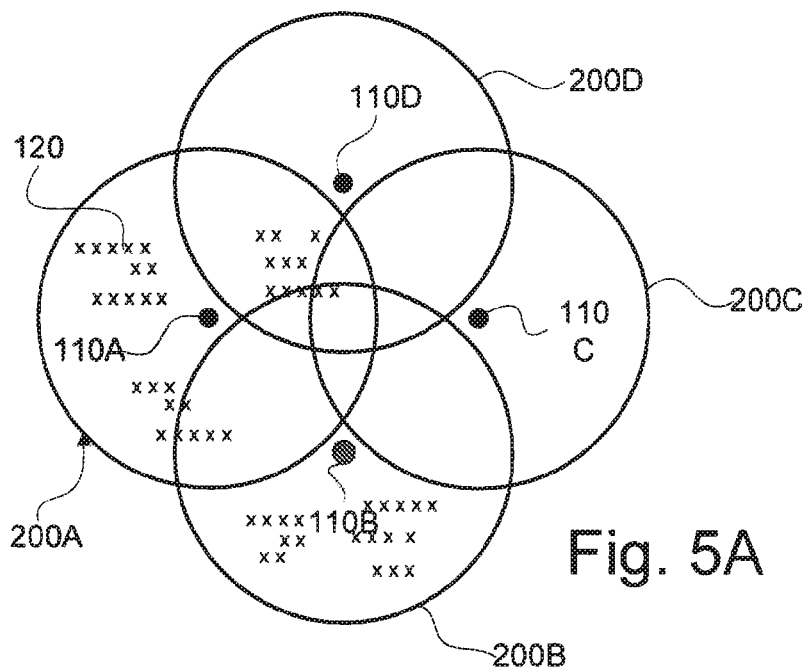
FIGS. 5A-C illustrates coverage areas, division of coverage area responsibility, and tailoring of coverage areas, respectively.

In the first phase, in one embodiment the system will set the access points 110a-d to a basic radiation pattern such as an omni-directional pattern then periodically connect to the mobile devices and query them for their locations. See FIG. 5A. At the same time it will determine the Received Signal Strength Indication (RSSI) or Signal to Noise Ratio (SNR) and/or the Angle of Arrival (AoA) of the transmission arriving from the mobile device and store this information in the database.

Figure 5B:
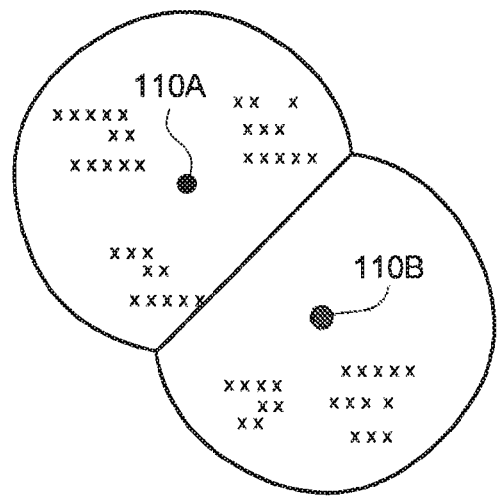

When sufficient information is collected, the system will assign each geographic location to the access point 110a-d that provided the best coverage for that location. This is illustrated in FIG. 5B. The location of the clients 120 within and being divided between two coverage areas/access points110a, 110b, is shown for purposes of simplicity and not by way of limitation. In actual implementation, clients would likely be disposed within all coverage areas and be assigned to all access points. The collection of locations assigned to a particular access point 110 becomes that access point's area of responsibility. The system then examines the geographic and/or RF distribution of the area of responsibility vs. the RSSI/SNR for each location and either selects a pattern 210A, B from a predetermined library or synthesizes a pattern 210A, B that it determines by mathematical computation will provide the enhanced coverage for its newly determined area of responsibility. See FIG. 5B. This radiation pattern 210A, B will become the initial guess or base pattern for phase 2, which alters the pattern to provide enhanced coverage based on, for example, actual client usage. See FIG. 5C.

In a second embodiment of phase 1, the system may do a sophisticated synthesis of the base pattern by, for example, by iteratively computing the probability of successfully transmitting a bit from every location in a coverage area. In this regard, the radiation patterns (i.e., base patterns) of FIG. 5C may be generated in phase 1 and these base patterns may be further refined in phase 2. In this embodiment, for each location, the system computes the best SNR for any access point using the location, height and current pattern on the access point together with a path loss curve. The system then takes the mean of the logarithm of all the probabilities and then perturbs the phases of antenna elements of each antenna array. The system selects those perturbations that improve the mean logarithm of the probability until no more improvement can be achieved. The result becomes the base pattern. It will be appreciated that some variation on or combination of these two approaches to phase 1 may provide the best result.

The second embodiment of phase 1 is more fully discussed in relation to FIGS. 5D-9B. One objective of the system is to maximize the probability that a packet transmitted anywhere within a coverage area can be successfully received by at least one of the antennas providing coverage for the area. The problem is addressed by both determining antenna radiation patterns and the sets of weights that produce the patterns, given a geographic boundary where wireless coverage is needed and based on a set of antenna locations and the orientation of those antennas.

To achieve this, several mathematical models are used:
1. A mathematical model of signal propagation loss versus distance between the transmitter (e.g., antenna) and receiver (mobile device). This model may be determined either based on measured data, or theoretical propagation.
2. A model describing the Area of Interest and Antenna locations. The AoI is divided into a number of grid cells. The grid cell size is at least several wavelengths on a side, but typically not more than a few hundred wavelengths. The model includes the antenna locations, height and orientations.
3. A model of the mobile device transmitter, specifically, the effective isotropic radiated power of the client device. The effective isotropic radiated power is the product of the antenna gain and the transmit power. The mobile device transmitter model may be utilized in phase 1. However, it will also be appreciated that is sufficient measurements exist for the coverage area, actual measurements may be utilized.
4. A mathematical model describing the probability of a packet being successfully received as a function of signal strength. This model may be derived based on theoretical foundations, such as the Eb/No curve of a particular waveform, or empirical evidence (i.e. experiment).
5. A mathematical model that describes the radiation pattern of the phased array antenna as a function of the beamformer weights. The radiation pattern of the phased array will be expressed as a function in azimuth and possibly elevation.

Figure 6:
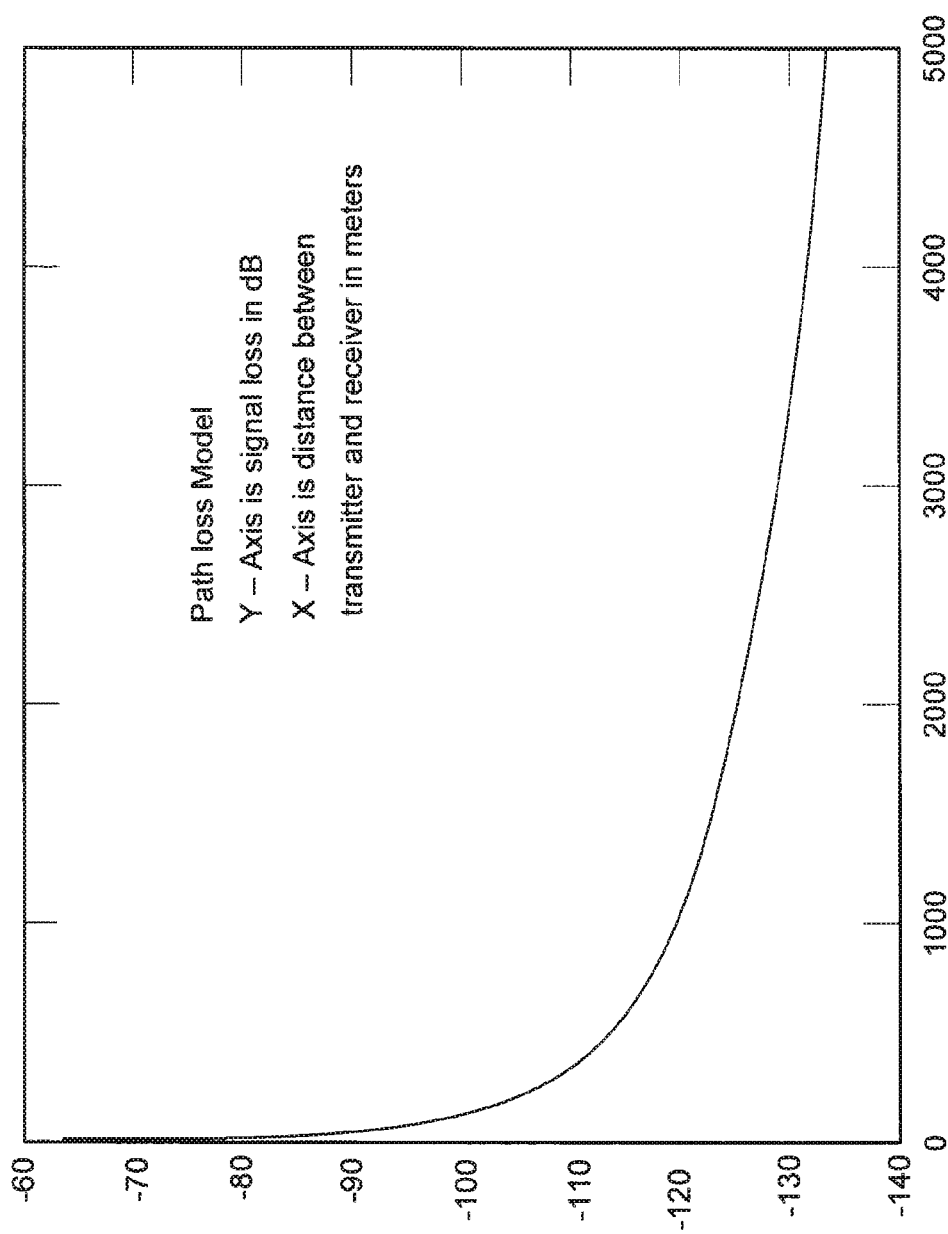
FIG. 6 illustrates a path loss model.

In relation to the first model, it is a general rule that the path loss of a signal increases as a function of distance between transmitter and receiver; as the path loss is expressed as a gain (e.g. $G_{PL}$), the gain value becomes smaller with increasing distance, or, when expressed as a decibel number, more negative. This is illustrated in the model of FIG. 6, which shows the attenuation of a free space signal increasing over distance. It will be appreciated that the curve illustrated in FIG. 6 may be defined by a mathematical equation or look-up table such that if a distance between a transmitter and receiver is known, an expected path loss may be determined.

Figure 5C:
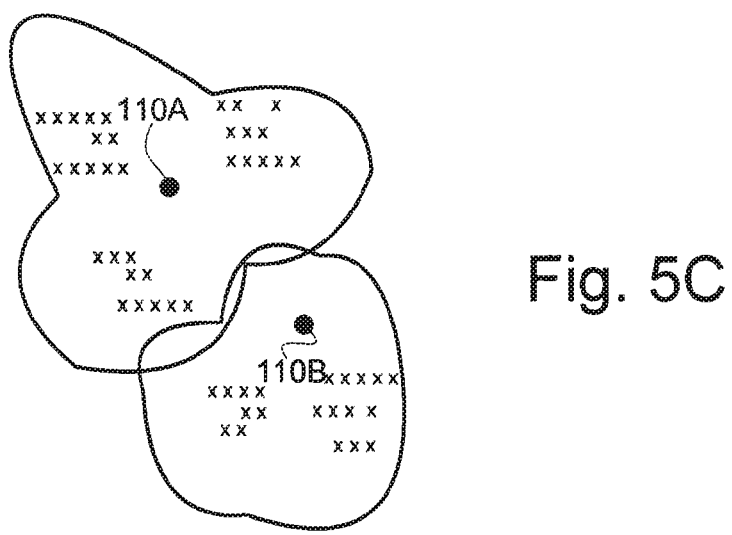
Figure 5D:
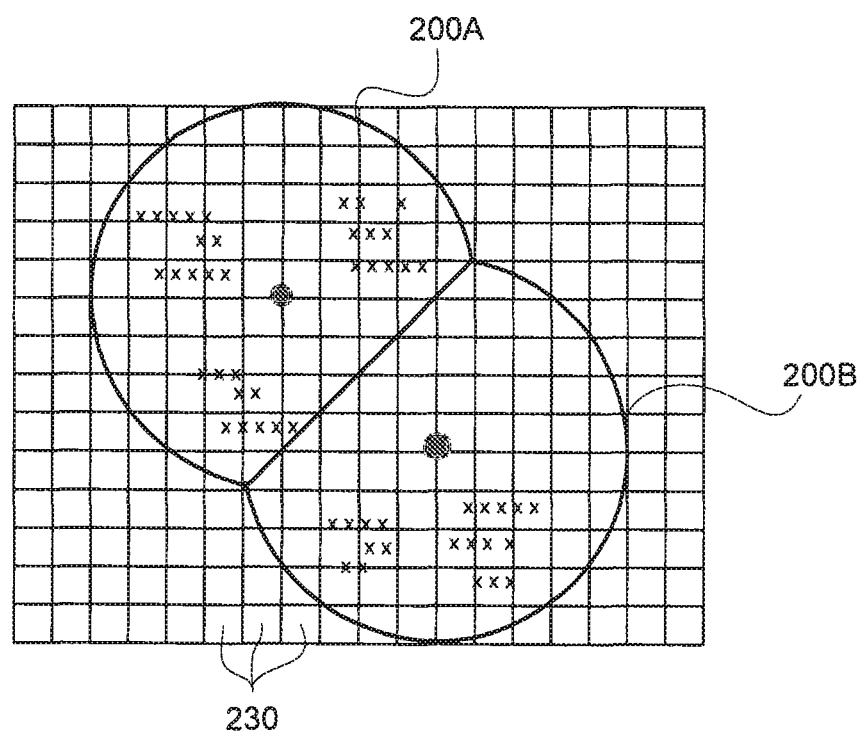
FIG. 5D illustrates dividing coverage areas into a grid.

The second model requires defining the coverage area and antenna locations. Referring to FIG. 5D, the boundaries of the coverage areas 200A-N are defined in a mathematical model and the location of the access points 110A-N are recorded at their locations within the model. Again, only two access points and their coverage areas are illustrated for clarity. Such a model may be based on longitude and latitude or may utilize its own coordinate system. In any case, the relative positions of the boundaries and access points are known. Once the model is created, it is divided into a grid as illustrated in FIG. 5D. The distances between the centers of each grid cell 230 and each of the access points is calculated and utilized to determine an estimated path loss ($G_{PL}$) between each grid cell and each access point using the first model. This is more fully discussed herein.

The third model constitutes the estimated radiated power of the mobile device transmitters that will be utilized within the coverage area. For some applications, all mobile transmitters may be of a common design and this value may be known. In other applications, a mathematical estimate may be utilized that may represent, for instance, an average or mean value of the mobile transmitters that are expected to be utilized within the coverage area. For non-limiting purposes of discussion, this model or value is referred to as the mobile device equivalent isotropically radiated power or 'EIRP'. Further, these values may be measured by the present system.

Figure 7:
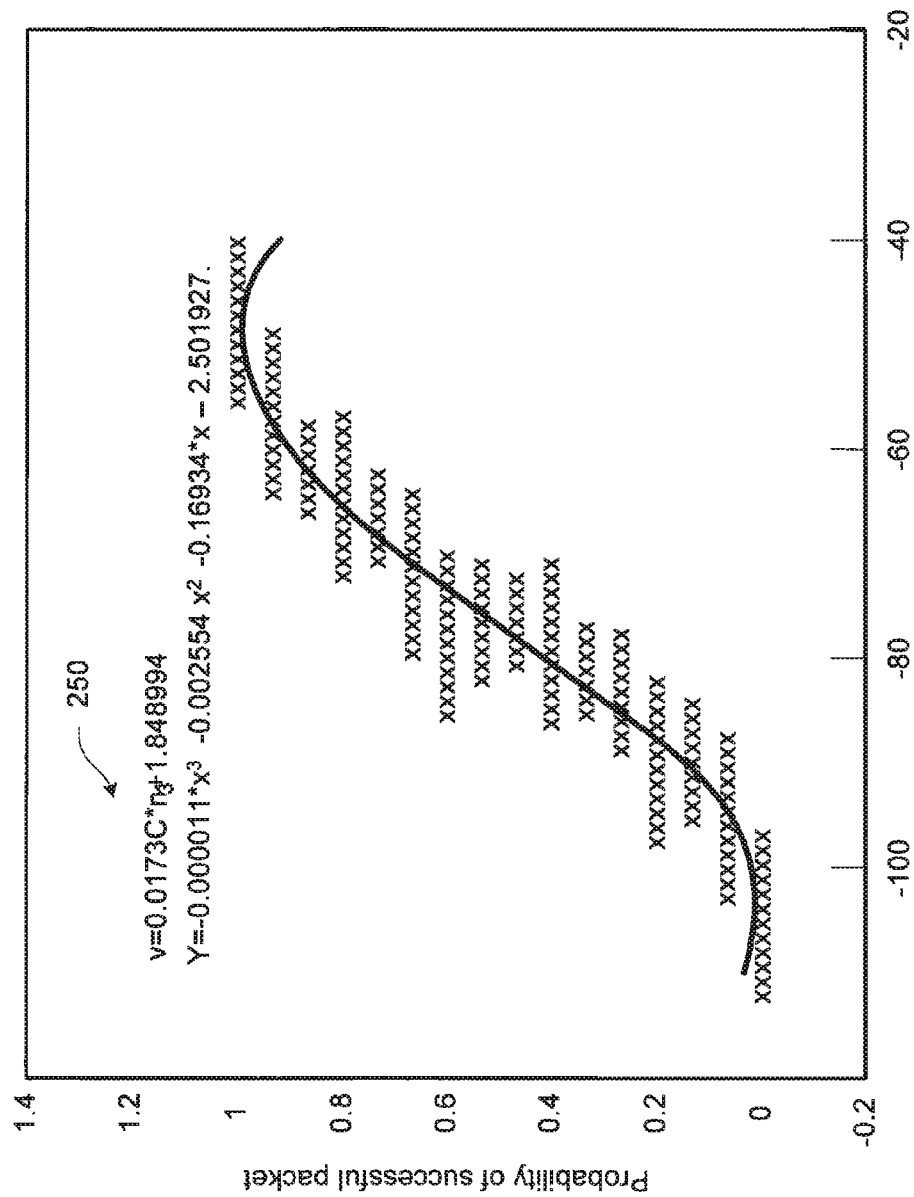
FIG. 7 illustrates a probability of successful transmission model.

The fourth model is a predictive model representing the probability of a packet being received as a function of signal strength, which is calculated from the third model based on the radiated power (e.g., estimated or actual) of the mobile devices utilized within the system. One non-limiting example of a curve representing such a model is illustrated in FIG. 7. As illustrated, empirically determined test measurement are made to identify the probability of success for transmitting a signal based on a received signal strength indicator from a mobile transmitter. It will be appreciated that the curve illustrated in FIG. 7 may be defined by a mathematical equation 250 or look-up table such that if an estimated signal strength a of a mobile transmitter accounting for a path loss ($G_{PL}$) due to a distance between a transmitter and receiver is known, a probability of successful ($P_S$) transmission can be estimated.

The fifth model is dependent upon the configuration of the adaptive antenna utilized by the access points. In this model, the beam patterns of the antenna relative to the weights and/or phases of the antennas are provided. That is, the models identify how a beam pattern for an adaptive antenna changes if one or more of the weights are adjusted. While information for each antenna may be known, the issues of how to make multiple antennas cooperatively provide more optimal coverage for an area remains.

Figure 8:
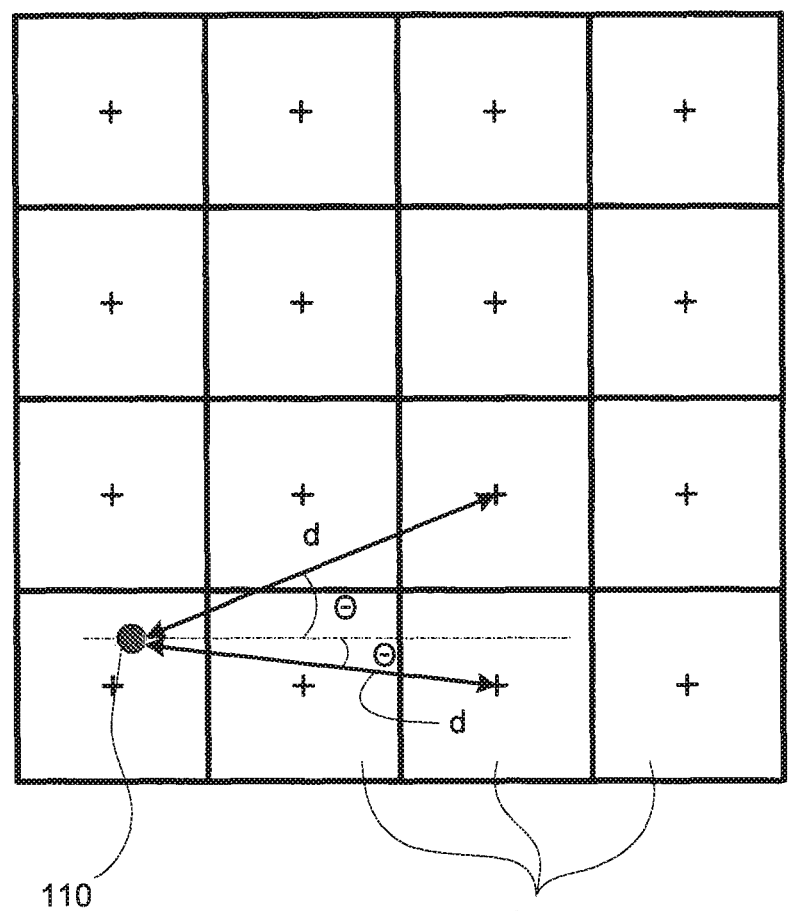
FIG. 8 illustrates calculation of distances and angles in an exemplary grid for a single access point.

Once all of the models are generated, an optimization process is performed to adjust the weights of the individual antenna elements to enhance or optimize the coverage of the access points. This process starts by generating a new model that contains the following: 1) For each grid cell, the path loss to every antenna; and 2) For each grid cell, the bearing angle from every antenna to that grid cell. This is illustrated in FIG. 8. As shown, the distance 'd' is calculated between each access point (only one shown for clarity) and the center of each grid cell (only two shown for clarity). The bearing angle θ (e.g., azimuth angle) is also calculated. Further, the altitude angle φ representing the elevation difference between the access point 110 and the center of each grid cell may also be calculated. Path loss from the access point to each grid is then calculated:

$$G_{PL(x,y)} = \text{pathloss}(d_{x,y}) \quad \text{EQ. 1}$$

Where: $G_{PL}$ is the path loss, expressed as a gain (1/loss).

pathloss is the mathematical model that describes the path loss between the access point and the grid cell.

$d_{x,y}$ is the distance between the access point and the center of the grid cell.

$G_{pl}$ is expresses the path loss—the amount of attenuation the signal experiences propagating from the transmitter to the receiver, independent of the antennas involved. $G_{PL}$ will commonly express the propagation gain in linear units (watts/watts). It will be appreciated that $G_{PL}$ may be readily converted to a logarithmic, decibel scale using the familiar relationship $G_{PL}$ (dB)=10*log 10(Gpl). Alternatively, some mathematical models of $G_{PL}$ will include this relationship, in which case $G_{PL}$ will be naturally expressed in decibels.

Once the this estimated path loss is determined for each grid cell 230, the probability that a packet will successfully be transmitted from each grid is calculated by first calculating for each grid cell, the signal to noise ratio of the signal received by each antenna:

$$SNR_{xy} = P_{tx} + G_{tx} + G_{rx}(\theta,\phi) + G_{PL} - P_{noise} \quad \text{EQ. 2}$$

Where:

SNR is the signal to noise ratio at the grid cell, expressed in decibels $P_{TX}$ is the transmit power, expressed in dBm $G_{TX}$ is the antenna gain of the mobile unit, expressed in dBi $G_{RX}$ is the antenna gain of the phased array in the direction of the grid cell, expressed in dBi.

$G_{PL}$ is the path loss from the phased array antenna to the grid cell $P_{noise}$ is the noise power at the phased array, expressed in dBm It will be appreciated that the noise power may be estimated a variety of ways and that the $P_{noise}$ may encompass not just thermal noise, but also interfering signals. For example, it could be computed from the Johnson/Nyquist noise in the bandwidth of interest. In 2.4 GHz, 802.11 networks, a fixed value of −95 dBm is commonly assumed. In IS-95 CDMA networks, a fixed value of −104 dBm is commonly assumed. It will also be appreciated that if information is available about the location of interfering signals, the noise estimate may become a function of the antenna gain.

In the case of the network service being provided by a single access point, once the SNR is calculated for each grid cell, the probability of a packet being successfully transmitted by a mobile unit in a grid cell to a particular phased array may be determined using the model that describes the probability of success vs. SNR (i.e. model #4):

$$P_{x,y} = P_S(SNR_{x,y}) \quad \text{EQ. 3}$$

This is illustrated for the bottom row of the grid cells 1,1-1,4 in FIG. 9A. Only the bottom row of cells is shown for purposed of illustration. In this exemplary embodiment, the probability of successful transmission decreases as the distance between the access point and each grid cell increases. The probabilities of successful transmission from each grid cell are then multiplied together to generate a joint probability that describes the overall probability of successfully receiving a packet transmitted from every cell in the coverage area:

$$P_{AoI} = \prod_{\text{all } x,y \text{ locations}} P_{x,y} \quad \text{EQ. 4}$$

In the present embodiment, $P_{AoI}=1.0 \cdot 0.7 \cdot 0.6 \cdot 0.4=0.18$. In an embodiment with a single access point, a change may then be applied to one of the antenna elements of the adaptive antenna. Based on this change, the above calculations may be repeated in a second iteration as illustrated in FIG. 9B. In this iteration, $P_{SCA}=1.0 \cdot 0.8 \cdot 0.7 \cdot 0.55=0.308$. As can be seen this change to the antenna element weight improves the overall probability of success for the coverage area. This process may be repeated twice for each antennal element of the adaptive antenna. Specifically, after an initial run (e.g., with default weights, such as those having an omni directional beam pattern) each antenna element may be adjusted up a predetermined amount and then down a predetermined amount. That is, for each antenna element the process includes increase the phase (or magnitude or both) of the beamformer weight applied to this element, on this antenna array. A typical value of phase change would be between 10 and 45 degrees, but any change is possible. For this change, the utility computes the overall probability of network success for this variation. Once computed, the utility decreases the phase of the beamformer weight applied to this element, on this antenna array. This phase change is generally equal and opposite to the increase selected above. Again the utility computes the overall probability of success for this variation. Once each antenna element in an array has been varied, the utility reviews the recorded probabilities of success and determines which one had the most favorable impact. This variation is selected and the weight associated with the most favorable variation is implemented for the corresponding element of the current antenna. That is, the largest $P_{SCA}$ value corresponds with the antenna weight that provides the largest improvement (e.g., most positive impact) to the probability of successfully transferring a packet from any location within the coverage area.

The entire process may start over again with the new weight being the initial weight of the adjusted antenna element. The process continues iteratively until the model converges. At the time of convergence, the antennas are set to the weights that define the beam pattern producing the best probability of successful transmission for the coverage area. That is, the beam pattern producing the best overall coverage is determined. In this current embodiment, the identification of an overall coverage of the area is reduced to a single number $P_{SCA}$ which facilitates the optimization of the beam pattern by a simple numerical comparison.

The foregoing description illustrated the case of a single access point covering an area. This process can be extended to include multiple access points covering an area of interest.

Figure 10:
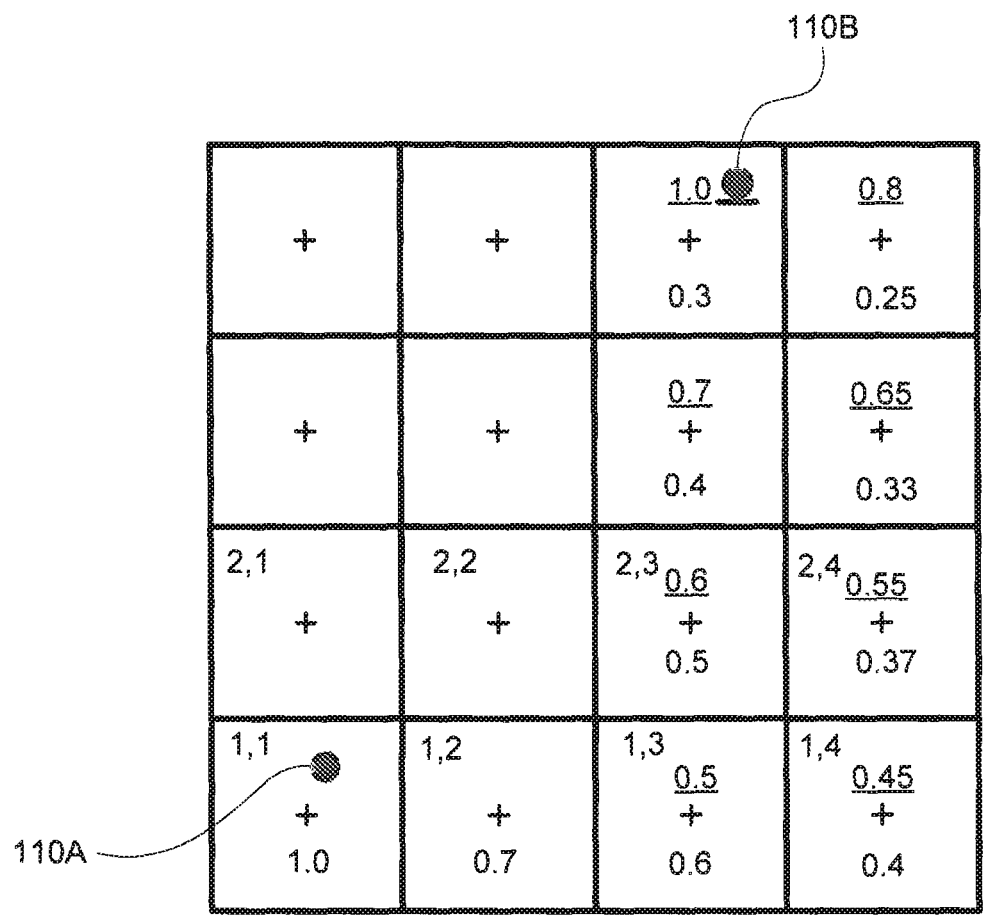
FIG. 10 illustrates calculation of distances and angles in an exemplary grid for multiple access points.

FIG. 10 illustrates the situation where multiple access points 110A and 110B provide overlapping coverage for a portion of a coverage area. In this example, as above, not all of the probability values are illustrated for purposes of clarity. However, it will be appreciated that these values are calculated for each cell of the grid. In this embodiment, the probability of success ($P_S$) values for access point 110B are underlined and the probability of success ($P_S$) values for access point 110A are without underline. As shown, the probability of success values of the two access points are higher nearer to each respective access point. Further, these access points 110A, 110B may each provide coverage to common grid cells.

For instance, in grid cell 2,3 the first access point 110A has a probability of successful transmission of 0.5 and the second access points has a probability of successful transmission of 0.6. In this arrangement, what is desired is that the grid cell have the highest probability of successful transmission to one access point, not all access points. In this regard, as access point 110B provides better coverage to this cell, the beam pattern of access point 110A may be adjusted to reduce the coverage to this cell and potentially provide enhanced coverage elsewhere. The above-noted process for adjusting the weights of a single access point to generate an enhanced or optimized beam pattern is readily adaptable to the situation where multiple access points are available.

In the embodiment of FIG. 10, the path loss, SNR and probability of success ($P_S$) values are again calculated for each cell and for each access point. This time, however, the probability of success for each grid cell is computed slightly differently than it was previously. It is desired to know the probability of successfully transmitting a packet from each grid cell to at least one access point while acknowledging that the packet may be received by more than one access point without error.

It is recognized that:

$$P_{success} = 1 - P_{fail} \qquad \text{EQ. 5}$$

Where:
$P_{success}$ is the Probability of successfully getting a packet through in any attempt
$P_{fail}$ is the probability of not getting a packet through successfully
Therefore, the probability of successfully getting a packet through on at least one access point is equal to one minus the probability of failing on all access points.

$$P_{x,y} = 1 - \prod_{n=all\ APs} (1 - P_n) \qquad \text{EQ 6}$$

Where:
$P_n$ is the probability of successfully receiving a packet transmitted from location (x,y) at $AP_n$
$P_{x,y}$ is the overall probability of being able to receive the packet transmitted from location x,y on at least one AP In a real system, the mobile device would go through a complete association/registration procedure with the access point prior to sending the packet. Nonetheless, this mathematical model captures the essence of the concept that the mobile station has the opportunity to connect through different access points and some will be more reliable than others. Furthermore, this formulation describes the fact that if the mobile can connect reliably to at least one access point, $P_{x,y}$ will be higher than if it cannot reliably connect through any access point.

Now with multiple Access Points, $P_{AoI}$ is computed using EQ 4, the same as before, but using the more sophisticated definition of $P_{x,y}$ given in EQ 6. This network success value can incorporate as many access points as exist in the network. For instance in FIG. 5A, the network has four access points. In that particular embodiment, the $P_S$ for every grid cell in the network would be calculated for every access point (i.e., four sets). Accordingly, adjustment of the weights to optimize the beam patterns of the access points would include iteratively adjusting the weights of each antenna elements of each access point. For adaptive antennas having eight antenna elements, this would result in 65 iterations. For each iteration, the probability of network success is calculated and at the end of the iterations, the weight change resulting most favorable improvement may be selected and implemented and the process may be restarted until the model converges (i.e., until additional changes provide no further improvement). FIG. 5C illustrates a situation where fifty full iterations has resulted in simultaneous configuration of the beam patterns of the four access points (only two shown) wherein coverage is provided to the coverage area and a reduced amount of coverage exists outside of the coverage area.

Figure 11:
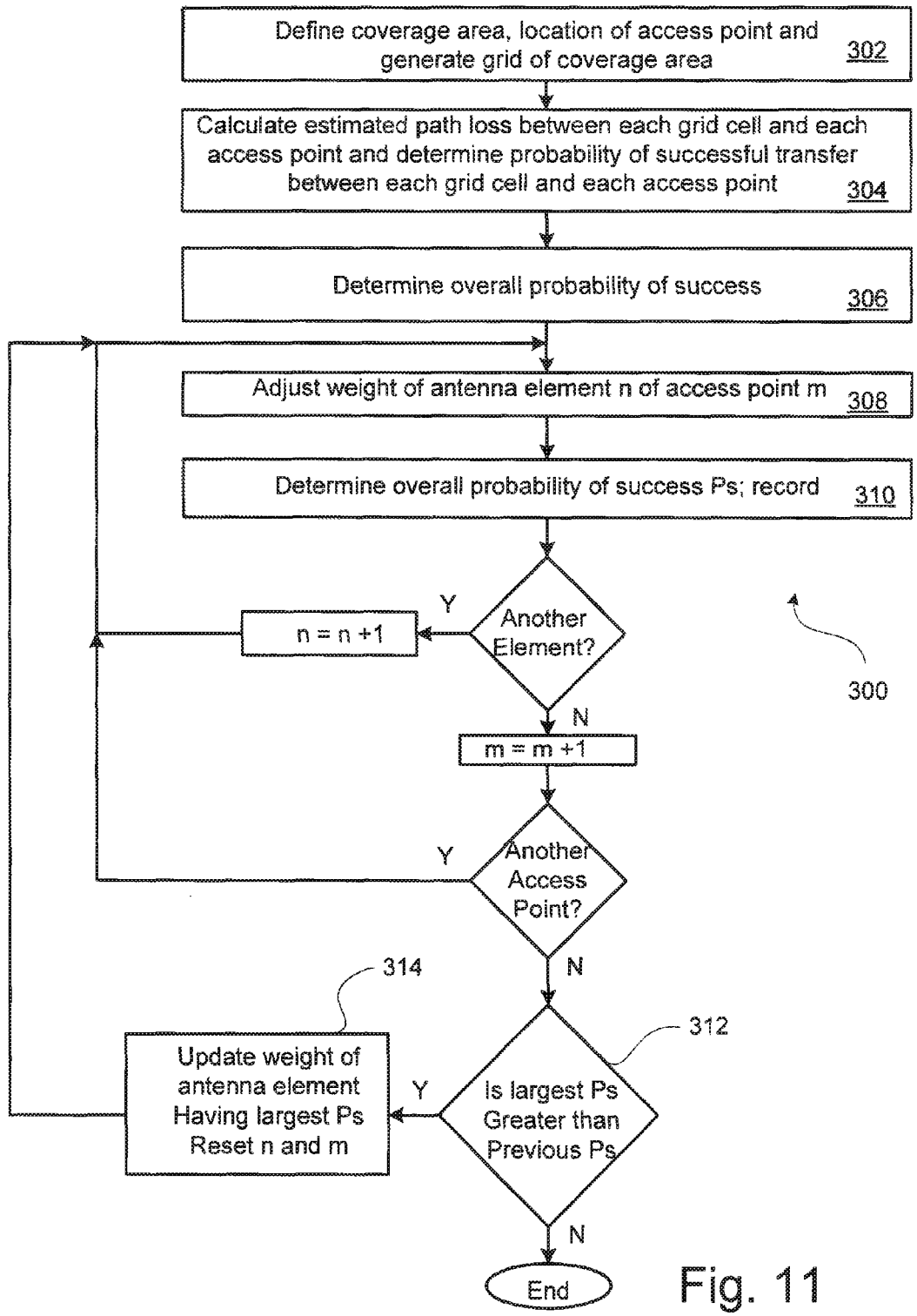
FIG. 11 illustrates a process for adapting radiation patterns of multiple access points.

The overall process 300, which is typically implemented as computer-executable instructions of computer programs and software that run on computers is illustrated in FIG. 11. However, it will be appreciated that individual steps of the process may be performed on separate computers/servers and/or at separate times. Initially, the process includes defining 302 a coverage area and location of access points to define a grid of the coverage area. In this step, the physical relative positions (e.g., distances and/or elevations) of the grid cells, boundaries and access points are defined. Once the grid is defined 302, the process 300 estimates 304 the path loss and probability of successful transfer of packets for each grid cell. Based on this information, the process determines 306 an initial overall probability of success for the network, which may include one or more adaptive antennas (e.g., arrays). The process then begins an adaptive process of adjusting 308 the weight of each antenna element of each array and for each adjustment, determining 310 an overall probability of success of the network for that particular adjustment. Each probability of success is recorded. As noted above, each adjustment of each element may include first and second or multiple adjustments (e.g., up and down phase, up and down magnitude etc.). Once all iterations have been made, the process determines 312 if the best improvement (e.g., highest probability of network success based on last full set of adjustments) is greater than the last probability of success. If so, the weight of the antenna element providing the improvement is updated 314 and the process continues. If the adjustments do not improve network probability of success or does not improve over a predetermined threshold, the model has converged and the process ends.

Phase 2 implements one significant variation to the process of Phase 1 above. Specifically, the model of signal propagation loss versus distance between the transmitter and receiver is based on measured data rather a theoretical mathematical model. This is particularly significant in many areas as the RF characteristics of such areas can differ substantially from free space theoretical models when the area has a large number of objects that either reflect or absorb RF energy. A model of signal propagation that is based on a large number of actual measurements within the specific area is much more accurate than one that is based on free space theoretical models and result in more useful patterns. This approach also lends itself to a process of continually measuring the RF environment within the area and adapting the patterns on an ongoing basis as the signal propagation characteristics of the area change over time.

In phase 2, the central server 150 periodically connects to the clients and queries them for their location. At approximately the same time, it queries the access point with which they are associated and requests signal quality information for the mobile device, such as Received Signal Strength Indication (RSSI) or Signal to Noise Ratio (SNR). Both the location and the signal quality information are put into the database, along with the time at which the measurement was taken. This periodic polling takes place on an interval of a few seconds to a few minutes.

Once a sufficient number of samples have been made, the central server makes minor adjustments to the parameters of the adaptive antennas. It does this by sending commands to the antennas, either directly or via the base station, that adjust the parameters that determine the adaptive antenna's radiation pattern.

For example, in the case of a phased array, the system tests the effect of the change in phase of each antenna element by a relatively small amount, such as 10-45 degrees. Tests are conducted by both increasing and reducing the parameter in question. For each variation, the traffic to and from mobile units in the area of coverage is monitored and the results stored in the database. If insufficient traffic is naturally occurring in the network to provide useful monitoring, then additional loopback traffic (e.g., queries) may be generated between the base station and the mobile units.

The system may optionally adjust the magnitude as well as the phase. After each perturbation, the central server records the current performance for each of the then-associated client devices, effectively sampling the area of coverage. Each perturbation of the antenna parameters will be of a size that causes only small changes in overall signal quality, yet they will be large enough to be measurable.

Once all the antenna's parameters have been tested and sufficient measurements have been gathered to effectively sample the area of coverage, the central server will determine the new reference value of the parameters that control the antenna (i.e. the "weights" in the case of a phased array).

An important part of the algorithm is the process of determining the quality of the coverage that one pattern provides compared to another. This is particularly difficult as each pattern may be measured at a very large number of locations. One algorithm that will work for determining the next set of antenna parameters is:

1. Establish a grid coordinate system for the coverage area. The grid scale will vary by application and propagation environment, but it is generally between a meter and a hundred meters.
2. Statistically characterize the wireless performance at each location in the gridded area to establish grid performance characteristics. This is done by a number of queries of the database, fusing together information regarding performance of individual wireless devices and their location. For example, a median SNR value of the wireless signal in each grid location may be determined. This characterization is performed both for the reference parameters of the antenna and each perturbation.
3. Assign each grid location a "weight" based on its relative importance. The weight may be determined based on how poorly the signal performance was in that grid location for the antenna reference parameters. That is, the original antenna setting (e.g., weights, phases etc.). Alternatively, the weight may be determined based on how often mobile subscribers tend to be in that grid location. See, e.g., FIGS. 2A and 2B. A hybrid approach combining both is also utilized. This weight establishes the relative importance of each grid cell.
4. For each variation from the reference parameters, and for the reference parameters themselves, the algorithm multiples the grid weight by the performance characteristic. This establishes an overall performance metric that describes the network performance for each variation and for the reference parameters.
5. For each parameter (e.g. "phase of element #1"), there are now three variations: characteristic value of the reference, characteristic value as the parameter is increased and a characteristic value as the parameter is decreased. A new reference value for each parameter is selected based on the three characteristics. The selection may be as simple as selecting the new parameter value based on the best performing of the three, or it may be more sophisticated, such as applying the well known Newton-Ralphson method.
6. The new set of reference parameters is configured into the antenna and the process begins over at step #2, above.

Figure 12:
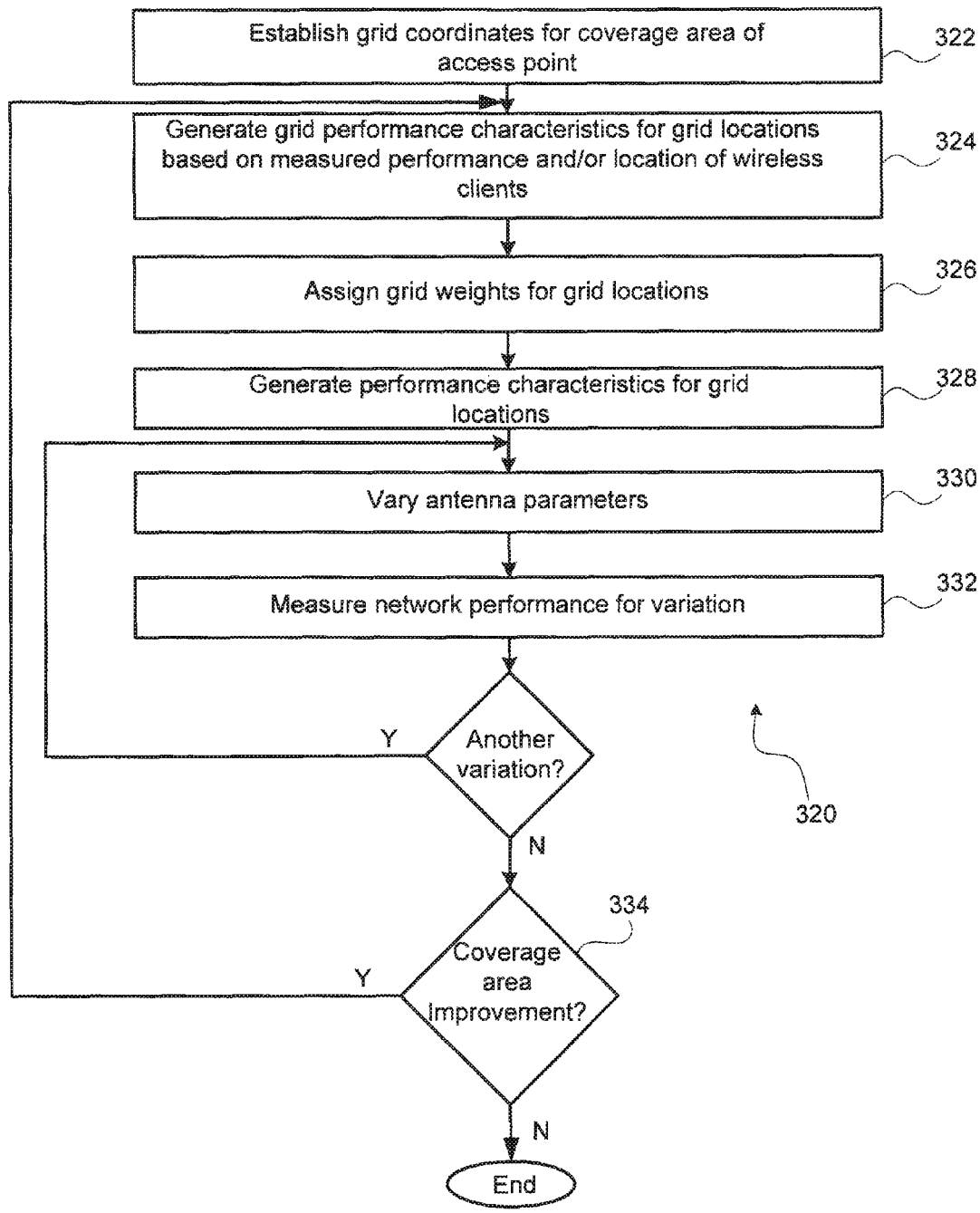
FIG. 12 illustrates a process for adapting radiation patterns of multiple access points based on measured signal information.

A process 320 illustrating the above-noted algorithm is set forth in FIG. 12. As shown, the process initially establishes 322 a grid for the coverage area of one or more access points. In this regard, a coverage area established in phase I may be divided into a grid having multiple grid cells/locations. The process then establishes 324 grid performance characteristics for the grid cells/locations based on actual measurements of wireless devices. As noted above, such measurements may include signal strength indications as received by the access point and/or received by the wireless client. In addition, the wireless clients provide location information. Such information may be queried in real-time or may be historical data obtained from a database. In this regard, a system implementing the process is operative to utilize the measured signal strength indications and location information to generate the grid performance characteristics. The process then assigns 326 grid weights for the grid locations. Such assignment may be based on signal strength and/or client usage of different grid locations (e.g., usage density). Based on the grid performance characteristics and grid weights, the process generates 328 performance characteristics for the grid locations. Once and initial set of performance characteristics is generated, the process varies 330 antenna parameters and measures 332 performance of the coverage area based on the variation. This may be repeated for multiple antenna elements and/or multiple antenna arrays. See, e.g., FIG. 11. Once all variations are made, a coverage area performance improvement determination 334 is made. If the overall performance is still improving, the process repeats. If there is no additional improvement, or if the improvement is below a predetermined threshold, the process ends. As will be appreciated, this process may be implemented based on changes to the network environment. For instance, the process may be implemented to account for changes in the environment (e.g., foliage) and/or based on changes in use of the network. In the latter regard, if the number of users significantly increases or decreases, the process may be implemented to tailor the coverage for the current network usage.

A second algorithm treats each measurement individually:
1. For each parameter, (e.g. "phase of element #1"), there are two possible variations: the parameter changed in the positive direction or the parameter changed in the negative direction. Assign a "vote" to that change—give it a+1 if the change resulted in a significant improvement, a−1 if the change resulted in a significant detriment, or a 0 otherwise.
2. Weights may be assigned to the votes based on how poorly the signal performance was for the antenna reference parameters and/or usage of a grid cell. The vote would be multiplied by the weight.
3. Add up the votes for each change. The changes with a significant positive total would be incorporated in the new pattern.
4. The new set of reference parameters is configured into the antenna and the process begins over at step #1, above.

A third algorithm uses a variation on the probability of successfully transmitting a bit from every location algorithm described above to estimate quality.

Over time, this any of these algorithms will result in a continuous improvement of the overall network performance. A hybrid version two or more of the algorithms may also be utilized.

Review

In a first optional set-up part, a user inputs a geographic description of the site into the software together with the locations of each phased array and information about the mobile devices. The software next conducts a survey, an initial set of measurements and uses the result to geographically divide the site into areas of responsibility, one for each phased array. Then it either selects a pattern from a pre-computed library or synthesizes a pattern for each phased array, attempting to provide a uniform signal to noise ratio (SNR) along the entire geographic and/or RF perimeter of the area of responsibility using a theoretical propagation model. Alternatively, the software uses the probability of successfully transmitting a bit from every location method described above to globally compute a set of base patterns. The result of this process is a set of weights—magnitudes and phases for the adaptive antenna array—that nominally produce the desired antenna pattern.

In a second part, the software takes the proposed pattern (called the base pattern) and creates multiple variants by systematically perturbing the parameters that are used to create the base pattern. These parameters are, in one embodiment, in the form of eight phase values (one for each antenna element) and eight magnitude values (again, one for each element). It then tests the base pattern and all the variations based on actual SNR measurements associated with clients at multiple locations in the coverage area. Using the results of these measurements to determine the relative merits of each pattern, the software attempts to create a "better" pattern. The software iterates through this process until it achieves a pattern with enhanced values. For instance, in locations known to have poor coverage (e.g., dead zones) the pattern may adjust until an average SNR value for cells associated with these locations are above a threshold value.

The system collects several different series of data in the form of SNR measurements for each of the patterns in a Pattern Set. A "Pattern Set" is the starting or base pattern plus its multiple variants. One Pattern Set is loaded on a phased array at any given time (if there are multiple phased array in use at one time, each will have a unique Pattern Set). A Data Series is a sequence of Pattern Sets that evolve from each other.

In order to implement the system, the initial subdivision of a coverage area including multiple access points into areas of responsibility for each access point may be done by a process analogous to a site survey (measuring the SNR for each phased array at a sample of locations and subdividing the site based on these measurements). This subdivision may be performed based on the information in the historical database, though this is not required. The software is operative to adjust the boundaries in subsequent iterations where it seems appropriate.

Generally, the software looks at the collected measurements and estimates new phase parameters in order for the Adaptive Antenna System to automatically tailor RF in a robust and repeatable manner. That is, the software is operative to generate an initial set up based on the 'site survey' performed by individual clients as they utilize the access point. The software is further operative to continually test the environment to see if the pattern can be improved once the initial pattern has been determined and to do this while the phased arrays are carrying traffic.

It is a goal of the system to minimize the number of locations with a "low" SNR where SNR is limited to a defined operating range while attempting to maximize the mean SNR. The notion of a "defined operating range" comes from the fact that increasing the SNR past a certain point (currently defined in the algorithm as 30 dB) provides very little additional benefit and with an SNR below a certain point (currently defined as 10 dB) the link generally doesn't operate. In between these two points, changes in the SNR make a significant difference with the difference being more noticeable at the lower end. One version of the software attempts to do this by computing a weighted mean SNR where more weight is assigned to lower SNRs.

The system determines when sufficient measurements have been taken to move on to the next Pattern Set and so that it can decide when the adaptation process is no longer going to provide an immediate improvement. Once the system provides an enhanced pattern(s) for a site during initially set up, the system works to both maintain the site in an enhanced state even though the site's RF environment changes and to re-optimize the site if there is a catastrophic failure in the RF infrastructure.

Each Pattern Set will be composed of the base pattern, multiple variations (e.g., sixteen) created by varying the phase parameters, and a number reference patterns interspersed among the variations (possibly just repetitions of the base pattern). The algorithm can use the results of these reference patterns for two purposes: (1) to determine how much of the variation seen between two patterns is not significant and (2) to help understand how often missing measurements are due to interference. Additionally, there may also be a measurement of the prior base pattern in each Pattern Set. If, in any given Pattern Set computation, the aggregate result of the prior pattern is better than the aggregate result for the new base pattern, the new base pattern will be discarded. This approach generally requires polling clients to determine if the pattern is an improvement over a previous pattern.

There are two places in the pattern adaptation process at which there may be heuristic decisions. Those decisions are (1) when is there a sufficient number of measurements to warrant evolving to the next pattern and (2) when has the process reached a state where additional iterations are not going to improve the outcome.

For the first decision, in one embodiment, the next pattern is typically computed when there were between 200 and 300 measurements for each antenna array. However, more or fewer measurement may be utilized. Further, the system may determine if the evolution of the pattern is sensitive to particular measurements (e.g., measurements in certain locations).

For the second decision, the criteria for terminating the initial optimization is generally based on a comparison of the current base pattern with several previous ones. This insures that the comparison of subsequent base patterns uses exactly the same set of locations, reducing the uncertainty in the comparison.

In yet other arrangements, these decisions may be made by performing ongoing statistical analysis of the data as it is collected to determine, for example and not by way of limitation, if the data in small areas (e.g., grid boxes) has means with small standard deviations for the first decision or whether the results of the newest pattern is not statistically different from that of the prior one. It will be appreciated that at each step of the process, the system has several choices of the method it may use and may choose one of the methods described above, a variation on one of the methods described above, or a combination of two or more of the methods described above.

Another task is for the patterns to continuously adapt to the changing environment on a site. The environment may change because the physical environment changes (e.g., foliage changes occurring during spring and fall) or because large amounts of activity of a coverage area move from one area to another (to the extent that the wireless clients are mobile, the system will attempt to enhance or optimize patterns for those portions of the site where the clients are currently located. In such an arrangement, there may be a constraint on an coverage area that is not present during the initial set up. That is, the ongoing adaptation must happen while the phased arrays are carrying the traffic used to operate the coverage area without interfering with that operation. Obviously part of this goal can be achieved by slowing down the pace of measuring—in the initial run it makes sense to do measurements almost as fast as the system can support them but here measurements can be done at a slower pace, such as every ten seconds.

Another task for the system is the ability to recover (as best it can) from the failure of an antenna array. Such a failure may be caused, for example, by lightning strike wind or hurricane etc. In some ways this ability is similar to doing the initial pattern evolution with a different set of phased arrays. The differences that the system will have to take account of are: (1) running an initial site survey is not possible because of the time it would take, and (2) testing proposed patterns will have to happen in the manner used for ongoing adaptation because the remaining phased arrays must be carrying traffic at all times. There are various possibilities for the sub-division process in the event of a failure of one antenna array. One is to do the sub-division using the geographic tessellation method. Another is to use the raw data collected in the original site survey to do the sub-division. In this regard, the system will in addition to reporting RSSIs between a sensor and the antenna array to which it is associated the system will report RSSIs to adjacent antenna arrays while the sensor was in the area assigned to the failed antenna array. Accordingly, it may be desirable to obtain RSSI data between clients and adjacent arrays to prepare a historical database prior to any malfunction.

Though various algorithms are discussed are discussed above for enhancing antenna patterns, it will be noted that other algorithms are possible and within the scope of the present disclosure.

The invention claimed is:

1. A method for providing coverage in a wireless network where at least a first access point provides RF coverage for client devices in at least a first geographic area, wherein each access point includes one or more electronically configurable antennas having adjustable radiation patterns comprising:
   identifying a location of an access point relative to a coordinate system of said first geographic area;
   receiving, at said access point, wireless communications originating from a plurality of wireless clients, wherein each wireless communication includes client location information for a corresponding one of said wireless clients;
   obtaining signal quality indications for said wireless clients, wherein each said signal quality indication is indicative of a signal quality of a corresponding one said wireless communications as received by said access point; and
   determining client positions in said coordinate system based on said client location information;
   recording, in an electronic storage media, said client positions and said signal quality indications;
   identifying at least first and second regions within said first geographical area having first and second different wireless client usage rates; and
   adjusting a radiation pattern of at least one electronically configurable antenna at said access point based on at least one client position and at least one corresponding signal quality indication to provide first and second different signal strengths to said first and second regions, respectively.

2. The method of claim 1, further comprising:
   recording in said electronic storage media, each said client position and each said signal quality indication for said plurality of wireless communications.

3. The method of claim 1, wherein establishing a coordinate system comprises establishing a grid for said geographical area, and further comprising:
   determining, based on said client positions and signal quality indications for said plurality of clients, statistical wireless performance characteristics for each client position in said grid.

4. The method of claim 3, wherein determining said statistical wireless performance further comprises:
   determining said statistical wireless performance based on signal quality indications from at least two wireless clients located in a common grid of said coordinate system.

5. The method of claim 1, wherein adjusting a radiation pattern of said at least one electronically configurable antenna comprises:
   adjusting a phased array antenna.

6. The method of claim 5, wherein after adjusting said radiation pattern, the method further comprising:
   querying at least one wireless client in said geographic area and requesting location information from said wireless client; and
   upon receiving a response from said wireless client including client location information, obtaining a signal quality indication for said wireless client that is indicative of a signal quality of said wireless communications as received by said access point; and
   determining a client position in said coordinate system based on said client location information; and
   one of:
      further adjusting the radiation pattern; and
      making no further adjustments based on the current position and signal quality indication.

7. The method of claim 6, further comprising:
   iteratively:
      querying one or more wireless clients to identify client locations and signal quality indications as received by the access point; and
      adjusting said radiation pattern until one or more wireless clients meet a predetermined signal quality threshold.

8. The method of claim 1, wherein adjusting said radiation pattern comprises, selecting a predetermined radiation pattern for said at least one electronically configurable antenna.

9. The method of claim 1, wherein adjusting the radiation pattern of the electronically configurable antenna comprises:
   extending signal power from the antenna to at least a first location in said geographical area to improve transmit and receive power between said antenna and at least a first wireless client.

10. The method of claim 1, wherein said first and second patterns are dynamically generated based on current usage in the first and second regions.

11. The method of claim 1, wherein said first and second different usage rates are identified for first and second different temporal periods and wherein adjusting the radiation pattern comprises utilizing a first radiation pattern during said first temporal period and using a second radiation pattern during a second temporal period.

12. The method of claim 11, wherein first and second radiation patterns are initially selected from a set of predetermined radiation patterns.

13. A computer implemented method for adjusting one or more adaptive antennas to provide coverage for a wireless network coverage area of a wireless network, comprising:
generating a grid having a plurality of grid cells for a wireless coverage area, wherein the coverage area includes at least one wireless access point having an adaptive antenna;
characterizing wireless performance for each grid cell to generate grid performance characteristics;
assigning each grid cell a weight value;
establishing a first coverage area performance value;
iteratively adjusting settings of antenna elements of said adaptive antenna of said at least one access point to generate a series of second coverage area performance values;
adjusting at least one antenna element to a setting that generated a second coverage area performance value greater than said first coverage area performance value; and
after adjusting said at least one antenna element to said setting, resetting said first coverage area performance value to said second coverage area performance value and repeating said iterative adjusting step.

14. The method of claim 13, wherein generating said grid further comprises identifying at least one of a distance, angle and elevation between each grid cell and said at least one access point.

15. The method of claim 13, wherein characterizing wireless performance for each grid cell comprises:
identifying locations of wireless devices in said grid and corresponding signal strength indications for said wireless devices.

16. The method of claim 15, wherein said locations and signal strength indications are received from wireless clients currently within said coverage area.

17. The method of claim 15, wherein said locations and signal strength indications are received for each iterative adjustment of said at least one adaptive antenna.

18. The method of claim 13, wherein assigning said weight value further comprises:
assigning a weight value based on signal performance measurements of said grid cells.

19. The method of claim 18, wherein said signal performance measurements comprise at least one of:
signal quality indications indicative of signals received from wireless devices by said at least one access point; and
signal quality indications indicative of signals received by said wireless devices from said at least one access point.

20. The method of claim 13, wherein assigning said weight value further comprises:
assigning a weight based on wireless device usage of each said grid cell.

21. A computer implemented method for adjusting one or more adaptive antennas to provide coverage for a wireless network coverage area of a wireless network, comprising:
generating a grid having a plurality of grid cells for a wireless coverage area, wherein the coverage area includes at least one wireless access point having an adaptive antenna;
characterizing wireless performance for each grid cell to generate grid performance characteristics;
assigning each grid cell a weight value based on wireless device usage of each said grid cell;
establishing a first coverage area performance value;
iteratively adjusting settings of antenna elements of said adaptive antenna of said at least one access point to generate a series of second coverage area performance values; and
adjusting at least one antenna element to a setting that generated a second coverage area performance value greater than said first coverage area performance value.

22. The method of claim 21, further comprising:
after adjusting said at least one antenna element to said setting, resetting said first coverage area performance value to said second coverage area performance value and repeating said iterative adjusting step.

23. The method of claim 21, wherein generating said grid further comprises identifying at least one of a distance, angle and elevation between each grid cell and said at least one access point.

24. The method of claim 21, wherein characterizing wireless performance for each grid cell comprises:
identifying locations of wireless devices in said grid and corresponding signal strength indications for said wireless devices.

25. The method of claim 21, wherein assigning said weight value further comprises:
assigning a weight value based on signal performance measurements of said grid cells.

26. The method of claim 21, wherein said signal performance measurements comprise at least one of:
signal quality indications indicative of signals received from wireless devices by said at least one access point; and
signal quality indications indicative of signals received by said wireless devices from said at least one access point.

* * * * *

UNITED STATES PATENT AND TRADEMARK OFFICE
CERTIFICATE OF CORRECTION

PATENT NO. : 9,100,974 B2  
APPLICATION NO. : 13/861919  
DATED : August 4, 2015  
INVENTOR(S) : Joseph Carey and Robert Weaver Page 1 of 1

It is certified that error appears in the above-identified patent and that said Letters Patent is hereby corrected as shown below:

Title Page, Item (57), lines 1 and 2, after automated, delete "a".

Title Page, Item (57), line 6, delete "utilizes" and insert therefor --utilized--.

In the Claims

At Column 21, line 63, after one, insert --of--.

Signed and Sealed this  
Twelfth Day of January, 2016

Michelle K. Lee  
*Director of the United States Patent and Trademark Office*